US012645757B1

(12) United States Patent
Penner

(10) Patent No.: US 12,645,757 B1
(45) Date of Patent: Jun. 2, 2026

(54) METHOD FOR SYNTHETIC DATA GENERATION

(71) Applicant: Andrew Penner, Roslyn Heights, NY (US)

(72) Inventor: Andrew Penner, Roslyn Heights, NY (US)

( * ) Notice: Subject to any disclaimer, the term of this patent is extended or adjusted under 35 U.S.C. 154(b) by 0 days.

(21) Appl. No.: 19/232,610

(22) Filed: Jun. 9, 2025

Related U.S. Application Data

(63) Continuation of application No. 19/202,892, filed on May 8, 2025.

(51) Int. Cl.
| | |
|---|---|
| *G06F 18/214* | (2023.01) |
| *G06F 3/04847* | (2022.01) |
| *G06F 17/17* | (2006.01) |

(52) U.S. Cl.
CPC ........ *G06F 18/214* (2023.01); *G06F 3/04847* (2013.01); *G06F 17/17* (2013.01)

(58) Field of Classification Search
CPC ..... G06F 18/214; G06F 3/04847; G06F 17/17
See application file for complete search history.

(56) References Cited

U.S. PATENT DOCUMENTS

| | | | | |
|---|---|---|---|---|
| 4,643,572 | A * | 2/1987 | Sonobe | G01J 3/06 |
| | | | | 356/334 |
| 6,539,391 | B1 * | 3/2003 | DuMouchel | G06F 16/30 |
| | | | | 707/999.102 |
| 8,873,256 | B2 * | 10/2014 | Sng | H02J 3/381 |
| | | | | 290/44 |
| 9,811,503 | B1 * | 11/2017 | Pasca | G06F 7/00 |
| 11,176,154 | B1 * | 11/2021 | Dasgupta | G06F 9/451 |
| 11,829,275 | B2 * | 11/2023 | Arechiga Gonzalez | |
| | | | | G01M 17/007 |
| 11,853,401 | B1 * | 12/2023 | Nookula | G06F 18/2163 |
| 12,380,369 | B1 * | 8/2025 | Joshi | G06N 20/00 |
| 2001/0055032 | A1 * | 12/2001 | Saito | G06V 10/46 |
| | | | | 345/660 |
| 2003/0065494 | A1 * | 4/2003 | Croix | G06F 30/33 |
| | | | | 703/2 |
| 2004/0190732 | A1 * | 9/2004 | Acero | G10L 21/0208 |
| | | | | 381/94.1 |
| 2004/0220983 | A1 * | 11/2004 | Kim | H04L 27/2679 |
| | | | | 708/160 |
| 2006/0085781 | A1 * | 4/2006 | Rapp | G06F 13/1694 |
| | | | | 716/117 |
| 2008/0183443 | A1 * | 7/2008 | Goren | G06F 30/33 |
| | | | | 703/2 |
| 2011/0219053 | A1 * | 9/2011 | Magee | G06F 7/00 |
| | | | | 708/270 |
| 2012/0223847 | A1 * | 9/2012 | Mazumdar | G06F 1/0356 |
| | | | | 341/100 |
| 2014/0172773 | A1 * | 6/2014 | Schmidt | G06F 16/24578 |
| | | | | 706/54 |
| 2017/0091622 | A1 * | 3/2017 | Taylor | G06F 17/18 |
| 2018/0067640 | A1 * | 3/2018 | Jiang | G06F 17/10 |
| 2018/0165846 | A1 * | 6/2018 | Stella | G06T 11/20 |

(Continued)

*Primary Examiner* — Jeremy L Stanley
(74) *Attorney, Agent, or Firm* — Cynthia S. Lamon; Lamon Patent Services

(57) ABSTRACT

A method for generating a synthetic dataset from an original dataset for creating and training machine learning models. The method includes a graphical user interface with inputs for setting values to be used in structuring Maclaurin series at datapoints and modifying results to generate new datapoints for the synthetic dataset.

12 Claims, 7 Drawing Sheets

(56) References Cited

U.S. PATENT DOCUMENTS

| | | | |
|---|---|---|---|
| 2019/0171775 A1* | 6/2019 | Martin | G06F 16/90328 |
| 2019/0332949 A1* | 10/2019 | Pereira | G06N 5/022 |
| 2020/0036512 A1* | 1/2020 | Vaikuntanathan | H04L 63/08 |
| 2020/0244435 A1* | 7/2020 | Shpurov | G06F 21/64 |
| 2020/0312322 A1* | 10/2020 | Cardinaux | G10L 15/16 |
| 2021/0042614 A1* | 2/2021 | Walters | G06F 18/24 |
| 2022/0245441 A1* | 8/2022 | Dechene | H04L 45/08 |
| 2022/0247643 A1* | 8/2022 | Dechene | H04L 41/122 |
| 2023/0126385 A1* | 4/2023 | Li | G06T 11/206 |
| | | | 345/440 |
| 2023/0186174 A1* | 6/2023 | Nitzken | G06N 20/20 |
| | | | 706/12 |
| 2023/0281427 A1* | 9/2023 | Sakhinana | G06N 3/094 |
| | | | 706/15 |
| 2023/0351181 A1* | 11/2023 | Cheema | G06N 3/084 |
| 2023/0376746 A1* | 11/2023 | Woo | G06N 3/048 |
| 2024/0054764 A1* | 2/2024 | Tao | G06V 10/771 |
| 2024/0095238 A1* | 3/2024 | Miller | G06F 21/6227 |
| 2024/0176475 A1* | 5/2024 | Poirier | G06F 3/04847 |
| 2024/0353825 A1* | 10/2024 | Thiruvenkatanathan | |
| | | | G05B 23/0229 |
| 2024/0394407 A1* | 11/2024 | Choudhary | G06F 21/6254 |
| 2025/0124274 A1* | 4/2025 | Pierquin | G06N 3/0475 |
| 2025/0225185 A1* | 7/2025 | Martin | G06N 20/10 |
| 2025/0252156 A1* | 8/2025 | Chung | G06F 21/6254 |

* cited by examiner

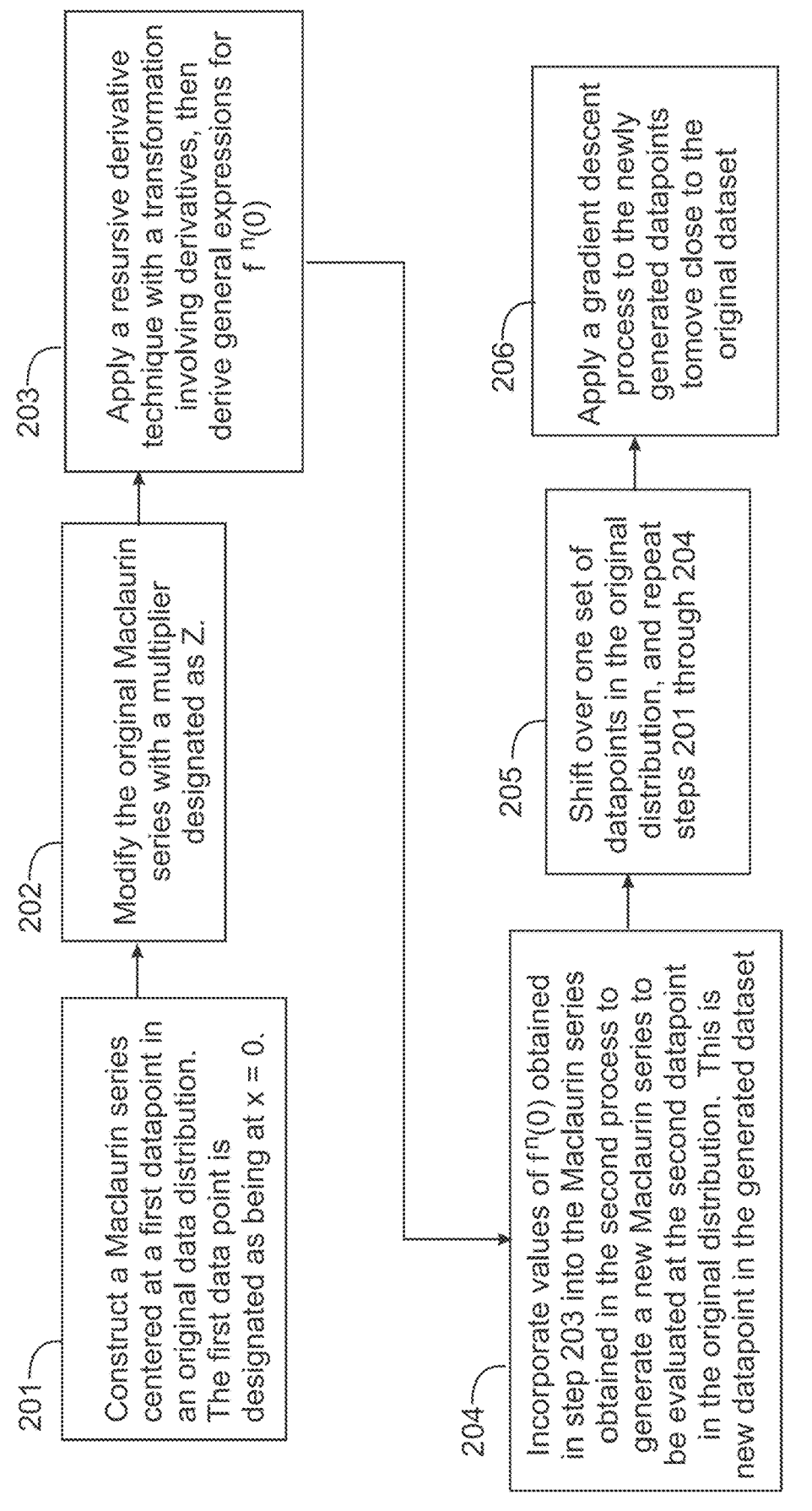

201 Construct a Maclaurin series centered at a first datapoint in an original data distribution. The first data point is designated as being at x = 0.

202 Modify the original Maclaurin series with a multiplier designated as Z.

203 Apply a resursive derivative technique with a transformation involving derivatives, then derive general expressions for $f^n(0)$.

204 Incorporate values of $f^n(0)$ obtained in step 203 into the Maclaurin series obtained in the second process to generate a new Maclaurin series to be evaluated at the second datapoint in the original distribution. This is new datapoint in the generated dataset 205 Shift over one set of datapoints in the original distribution, and repeat steps 201 through 204

206 Apply a gradient descent process to the newly generated datapoints tomove close to the original dataset

*Fig. 2*

METHOD FOR SYNTHETIC DATA GENERATION

CROSS REFERENCED TO RELATED APPLICATIONS

This application is a continuation application of co-pending U.S. application Ser. No. 19/202,892, filed May 8, 2025. All disclosure of the parent application is incorporated at least by reference.

BACKGROUND OF THE INVENTION

1. Field of the Invention

The present invention is in the technical field of creating synthetic data and pertains more particularly to generating such data efficiently and in large quantity.

2. Description of Related Art

Synthetic data is used to mimic real-world data. Uses for synthetic data include training machine learning models when access to real data is limited, expensive to obtain, or contains sensitive information that needs protection. Synthetic data can be used for research, testing new developments, and scenarios where generating large volumes of data is necessary, all while maintaining the statistical properties of the original data without compromising privacy concerns.

Uses for synthetically generated data include training artificial intelligence (AI) AI models. When real data is scarce or difficult to acquire, synthetic data can be generated to train machine learning models in various domains like healthcare, finance, and customer analytics. By creating synthetic datasets that resemble real data but contain no actual sensitive information, enterprises can test algorithms and models without exposing private details.

Generating large volumes of synthetic data allows for robust testing of systems under high load conditions, identifying potential bottlenecks. Synthetic data can be used to explore different scenarios and test hypotheses in research settings where real data might not be readily available. Synthetic data may be used for supplementing existing datasets to increase diversity and volume of training data for better model performance.

Synthetic data is known to be generated using statistical distributions and relationships to generate data that follows similar patterns to the real data. Synthetic data is also generated in what are termed Generative Adversarial Networks (GANs). GANs are an advanced AI technique where two neural networks compete, one generating synthetic data and the other evaluating its realism against real data. Another technique is termed Variational Autoencoders (VAEs) which is another AI method that learns a compressed representation of existing data and then generates new data based on that representation.

There are some rather important considerations when using synthetic data. One is ensuring that the synthetic data accurately reflects the key characteristics and statistical properties of the real data. It is also important generally to avoid circumstances where the synthetic data becomes too much like the original training data, potentially limiting its applicability. Furthermore, one should be mindful of potential biases in the original data that might be replicated in the synthetic data.

Methods are known for generating synthetic data, as mentioned above, such as distribution sampling and utilizing generative neural networks. But these conventional procedures are not very efficient and are computation intensive. What is clearly needed is a method more efficient and direct, to generate large quantities of synthetic data.

BRIEF SUMMARY OF THE INVENTION

In one embodiment of the invention a method for generating a synthetic dataset is provided, comprising steps for selecting an original graph of data points as an original dataset, constructing a first Maclaurin series at a first data point in the original graph of data points, multiplying the input, X, of the first Maclaurin series by a constant, applying a recursive derivative process, deriving general expressions for the nth derivative of the original graph at X=0, that is $f''(0)$, incorporating derived values of $f''(0)$ into the first Maclaurin series, generating a new Maclaurin series, evaluating the new Maclaurin series at the second datapoint in the original graph as a first datapoint in the synthetic dataset, shifting to a second data point in the original series, repeating the previous steps to generate a second datapoint in the synthetic dataset, and repeating the steps in order until the last datapoint in the original series has been used to generate a final datapoint in the synthetic dataset.

In one embodiment the constant multiplier is selected as either a positive decimal or a positive integer value, with the same stipulations applying to X. Also, in one embodiment an interactive graphic user interface (GUI) is provided on a display screen of a computerized appliance, the GUI having input mechanisms enabling a user to upload the original dataset, to enter values for variables in the Maclaurin series and parameters required to implement the steps to generate synthetic data sets from the original data set, comprising (a) uploading the original dataset, (b) entering the variable values and parameters, and (c) selecting a "generate data" input, upon which the computerized appliance performs the steps of the method and generates a number of synthetic datasets according to a No. of cycles input, and a new dataset consisting of both the original and the new data distributions is exported to an excel file and saved. In one embodiment the GUI further comprises an input to open a graph window on the display screen of the computerized appliance and to display the original and generated datasets. And in one embodiment the GUI has a "reset" input, that, when selected, clears all parameters and removes all graphs.

In another aspect of the invention a system for generating synthetic datasets is provided, comprising a computerized appliance having a processor and a display screen, software executing on a processor of the computerized appliance, and a graphical user interface (GUI) displayed on the display screen of the computerized appliance by the software executing on the computerized appliance, the GUI having input mechanisms enabling a user to upload an original dataset, to enter values for variables in a Maclaurin series and parameters required to implement steps to generate synthetic data sets from the original data set, the steps comprising (a) uploading the original dataset, (b) entering the variable values and parameters, and (c) selecting a generate data input, upon which the computerized appliance performs the steps of the method and generates a number of synthetic datasets according to a No. of cycles input, and a new dataset consisting of both the original and the new data distributions is exported to an excel file and saved.

In one embodiment of the system, upon a user selecting the "generate data" input the system constructs a first Maclaurin series at a first data point in the original graph of data points, multiplies an output of the first Maclaurin series by a constant, applies a recursive derivative process deriving general expressions for the nth derivative of the original graph at X=0, incorporates derived values of the nth derivative $f''(0)$ into the first Maclaurin series, generating a new Maclaurin series, evaluates the new Maclaurin series at a second datapoint in the original graph as a first datapoint in a synthetic dataset, shifts to a second data point in the original series, repeats the previous steps to generate a second datapoint in the synthetic dataset; and repeats the process until a last datapoint in the original series has been used to generate a final datapoint in the synthetic dataset.

In one embodiment the GUI has an input for setting a value for the multiplier constant, an input for setting a value for a distance along the x axis for which the Maclaurin series will be evaluated, an input for setting a value for a number of iterations for the gradient descent process, and an input for setting a value for a learning rate as a change in each iteration. Also, in one embodiment the GUI further has an input for a value that may be used to lower the learning rate exponentially, an input for a value that will be the number of nth derivative terms which will be calculated per data point, an input for a value that will be the number of times the overall process will be run, and an input for a value to for a variable in the dataset that will be selected for graphing after the data has been generated.

In one embodiment of the system the input for the distance along the x axis for which the Maclaurin series will be evaluated, and the input for the multiplier constant are each a slider on a track that a user may move to increase and decrease the values. In one embodiment a value is displayed in the GUI for the distance along the x axis and for the multiplier constant proximate the sliders used to select the values. And in one embodiment the input for the value used to lower the learning rate exponentially and the input for the value that will be the number of nth derivative terms which will be calculated per data point are each a slider on a track that a user may move to increase and decrease the values, and a value selected by the slider is displayed proximate the slider.

BRIEF DESCRIPTION OF THE SEVERAL VIEWS OF THE DRAWINGS

FIG. 2 is a flow diagram of steps in a process in an embodiment of the invention.

DETAILED DESCRIPTION OF THE INVENTION

To address the challenge of generating artificial/synthetic data distributions from an original distribution, a novel, inventive and unique method is taught herein. The process taught here has considerable value for any application in which generating a similar but not identical distribution to an original given distribution is desired. This method is particularly effective and efficient in generating high quality synthetic data in very large quantities.

Potential areas of particular utility include any endeavors in which obtaining additional data for use in AI related processes is valuable and/or desired. This includes, but is not limited to machine learning augmentation, fraud detection, healthcare research and development, and financial/stock predictions.

As an overview, the method taught in this invention involves constructing a Maclaurin Series centered at every individual point on a given data distribution and using these Maclaurin Series to generate synthetic data. Several unique steps are necessary to achieve this result. Firstly, each newly constructed Maclaurin Series is subjected to a process involving a multiplier. Afterwards, information is obtained through a derivative-based method, which utilizes information from each original datapoint and its subsequent neighbor. Specifically, by using the derivative-based method, the nth derivatives of the original distribution may be approximated at the point designated as x=0. These nth derivatives, which pertain to rates of change of the function at the designated point x=0, are then used to approximate coefficients which may be used to construct a new Maclaurin Series for each point. These newly constructed Maclaurin Series are then evaluated at specific values on the x-axis of the original distribution. In so doing, a new datapoint is generated corresponding to a synthetic distribution for each datapoint on the original distribution. Additionally, a gradient descent method is used to increase the proximity of the synthetic distribution to the original.

The overall process in one embodiment of the invention comprises six separate processes, each separate process comprising one or more steps.

Figure 1:
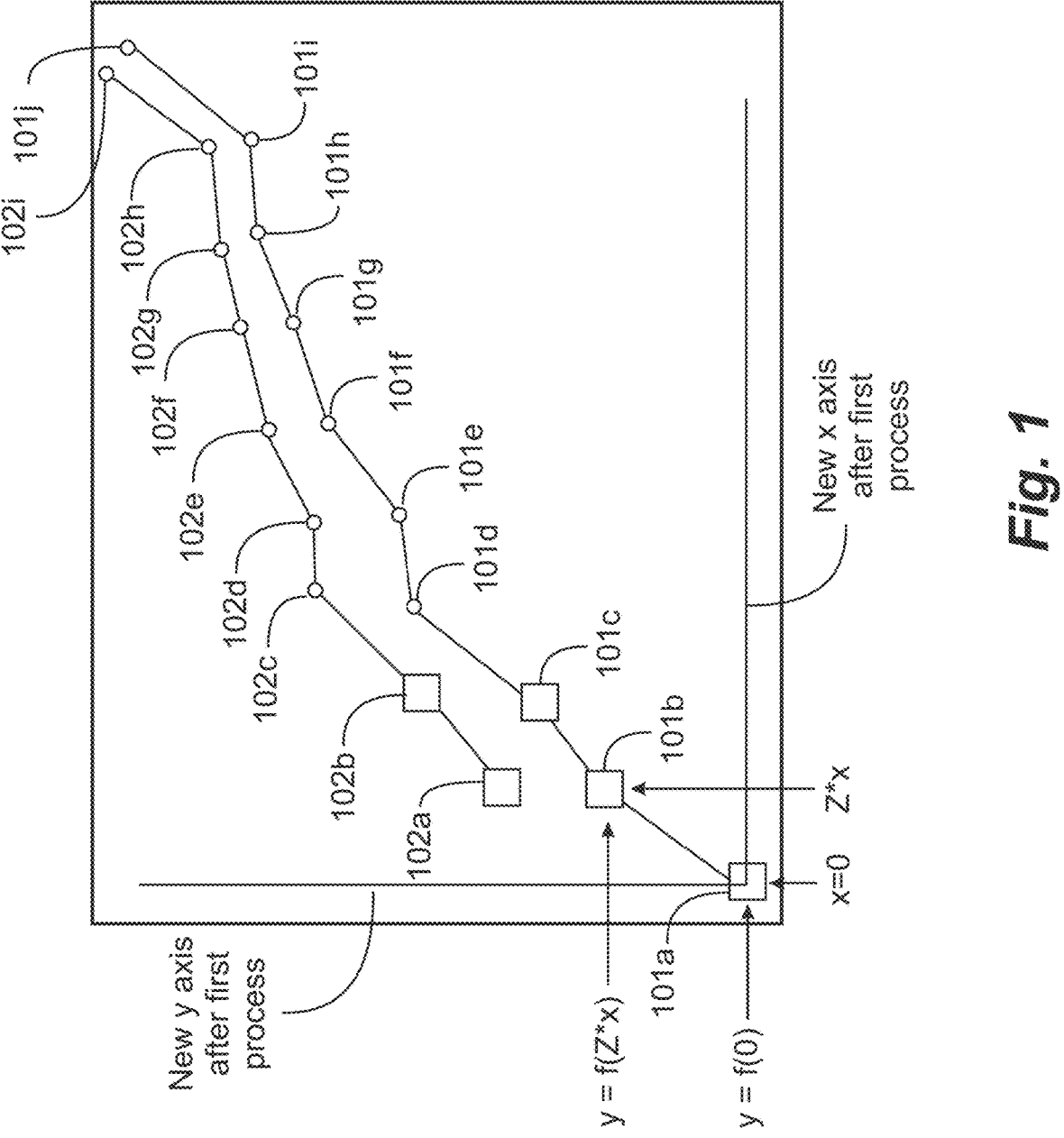
FIG. 1 is a graph of data points in an embodiment of the invention.

FIG. 1 is a graph of an original set of data points labeled points 101a through 101j, and a set of generated data points 102a through 102i, generated by an overall process as described below.

FIG. 2 is a flow diagram illustrating six steps in generating the set of synthetic generated datapoints from the existing set of data in an embodiment of the invention.

Step 201

The first process, shown as step 201, involves constructing a Maclaurin Series centered at a first datapoint in the original distribution, which in this example is arbitrarily taken to be the data point in the original distribution with a least value of x. In FIG. 1 this is point 101a. The axes are shifted so this point is at x=0 and y=0. The new axes after the first process are shown in FIG. 1.

The Maclaurin series equation is:

$$f(x) = f(0) + x * f'(0) + \frac{x^2}{2!} * f''(0) + \frac{x^3}{3!} * f'''(0) + \frac{x^n}{n!} * f^n(0)$$

Where values correspond to:

X=the distance along the x axis for which the Maclaurin series will be evaluated. This value must be a positive integer or a positive decimal.

f(0)=the y value of the first datapoint of the original distribution f'(0)=the first derivative of the original distribution at the x value of the first datapoint of the original distribution.

Step 202

The second process, shown as step 202, involves modifying the original Maclaurin Series by using a multiplier. The process involves selecting a multiplier Z, which must be a positive integer or decimal, and creating a new Maclaurin series with input Z*x and output y=f(Z*x).

Starting with the original Maclaurin series:

$$f(x) = f(0) + x*f'(0) + \frac{x^2}{2!}*f''(0) + \frac{x^3}{3!}*f'''(0) + \frac{x^n}{n!}*f^n(0)$$

Multiplying by Z creates a new series:

$$f(Z*x) =$$
$$f(0) + x*Z*f'(0) + \frac{x^2}{2!}*Z^2*f''(0) + \frac{x^3}{3!}*Z^3*f'''(0) + \frac{x^n}{n!}*Z^n*f^n(0)$$

Step 203

The third process involves using a recursive derivative technique in conjunction with an innovative transformation method involving derivatives. This allows for calculation of multiple approximations of the values of $f^n(0)$, where $f^n(0)$ corresponds to the nth derivative of the original distribution at x=0.

Firstly, approximate f'(0):

$$f(Z*x) \sim f(0) + Z*x*f'(0)$$

Rearrange this algebraically to obtain:

$$\frac{f(Z*x) - f(0)}{x*Z} \sim f'(0)$$

Now derive general expressions for approximations of $f^n(0)$ using a derivative based method to establish a recurrence relationship:

$$Z^{n-1}*f^n(Z*x) \sim Z^{n-1}*f^{n-1}(0) + Z^n*x*f^n(0)$$

Rearrange this algebraically to obtain a general expression for f'(0):

$$\frac{Z^{n-1}*f^n(Z*x) - Z^{n-1}*f^{n-1}(0)}{x*Z^n} \sim f^n(0)$$

This general expression may be used to recursively calculate subsequent values of $f^n(0)$ using previous values $f^{n-1}(0)$.

In this manner f'(0) may be used to calculate f''(0), and the value of f''(0) may be used to calculate f'''(0), and so on.

Step 204

The fourth process, shown as step 204, involves incorporating the values of $f^n(0)$ obtained from the third process into the Maclaurin Series obtained in the second process to generate a new Maclaurin Series, which is then evaluated at the x-value of the second datapoint in the original distribution. This results in generation of a first new datapoint, which approximates the second datapoint of the original distribution.

In the initial step in the fourth process, coefficients for a new Maclaurin series are calculated from $f^n(0)/(n)!$. So first coefficient is f'(0)/(1)!, which is f'(0)/1. When sufficient coefficients are developed the new Maclaurin series is:

$$f(Z*x) =$$
$$f(0) + x*Z*\frac{f'(0)}{1} + \frac{x^2}{2!}*Z^2*f''(0) + \frac{x^3}{3!}*Z^3*f'''(0) + \frac{x^n}{n!}*Z^n*f^n(0)$$

This new Maclaurin series is then evaluated at the x value of the second datapoint in the original distribution. The resulting output is a new datapoint, which is the first synthetic datapoint.

It should be noted that these steps intertwine and are all necessary in the overall method. Specifically, in step 3, the actual datapoints corresponding to the original distribution at y=f(0) and y=f(Z*x) are being used to approximate the values of f''(0). These values of $f^n$ (0) are then used to calculate coefficients, which are equal to f''(0)/n!

These newly calculated coefficients are then incorporated into the Maclaurin Series obtained in process 2 to generate a new Maclaurin Series, which is evaluated at the second point on the original distribution to obtain the first synthetic datapoint. This first synthetic datapoint approximates the second datapoint on the original distribution.

Step 205

The fifth process involves repeating processes 1-4 after shifting over one datapoint in the original distribution. In this manner, the second datapoint of the original distribution will now be designated as being at x=0, and a second new Maclaurin Series is centered around this point. The third datapoint of the original distribution is used in conjunction with the second datapoint from the original distribution to approximate new $f_n$ (0) values to calculate new coefficients, designated as f''(0)/n!. These new coefficients are then incorporated into the Maclaurin Series obtained in process 2 to generate a second new Maclaurin Series. This second new Maclaurin Series is evaluated at the x-value of the third datapoint on the original distribution to generate a second datapoint for the synthetic distribution. This process repeats along the length of the original distribution.

Referring now back to FIG. 1, the original dataset has points labeled 101a through 101n. The new dataset are points 102a through 102n.

Step 206

In a final process, a gradient-descent method may be applied to the newly generated datapoints on the new distribution so that they may become as arbitrarily close to the original distribution as may be desired. This step is optional but can allow for significantly improved approximations if desired.

Firstly, values for multiplier Z and for x are assumed. Then new parameters, an iterations value N and a learning rate L are defined. The number of iterations refers to the number of times which Z and x are mathematically adjusted using gradient descent. L is a number which reflects on the size of change applied in each iteration.

For each new datapoint generated using Processes 1-5, the values of the multiplier Z and x will be adjusted according to:

$$Z_{new} = Z_{old} - (\text{New} - \text{Original Datapoint})*L*Z_{old}$$

$$x_{new} = x_{old} - (\text{New} - \text{Original Datapoint})*L*x_{old}$$

Once all iterations of the gradient descent process are completed, which will generate more optimal values of Z and x, processes 1-5 may be applied using the final adjusted values obtained for Z and x. This generates a synthetic distribution that has been altered with gradient descent.

All processes may be repeated to create new data distributions which are similar yet not identical to the original data distribution from which they are generated.

Utilizing the methods presented as embodiments of this invention has many practical applications and has considerable value for any application in which generating a similar but not identical distribution to an original given distribution is desired. This includes but is not exclusive to the generation of synthetic data for machine-learning purposes.

The methods taught in the instant application are particularly useful for generating synthetic data for the following reasons:

(1) This method is readily programmable into computer code and can thus be incorporated into software for synthetic data generation.

(2) This method is efficient and accurate, and can generate synthetic data distributions multiple times, essentially doubling the number of datapoints in a dataset with each iteration.

(3) Despite the many calculations and iterations involved, the overall computational cost is significantly less than what would be involved in training GANs (generative neural networks).

Importantly, the synthetic data distributions generated with this unique method are easily adjustable through gradient descent, to allow for either closer or looser approximations. The ability to do this can prevent a fit that is too close or too far from the original for the purposes of creating and/or training machine learning models.

Additionally, if a looser fit is desired as opposed to a closer fit, the original data can be run multiple times/cycles through the GUI to produce looser fitting distributions, which can then be made closer to the original using gradient descent if desired. This allows for great flexibility/adjustability of the generated data.

The data generated can be easily integrated into machine learning models. Thus, as the amount of synthetic data generated using this process increases, machine learning models will be capable of being trained more effectively and can achieve better average cross-validation scores than when using the original data alone.

In a practical application of an embodiment of the invention a system is provided wherein a user may visit a hosted Internet site with a browser and use interactive interfaces generated by the site to create synthetic data sets from an original data set or alternatively may download a mobile application that may be executed on a user's platform to generate synthetic data sets. The operation will be essentially the same in either circumstance.

Figure 3A:
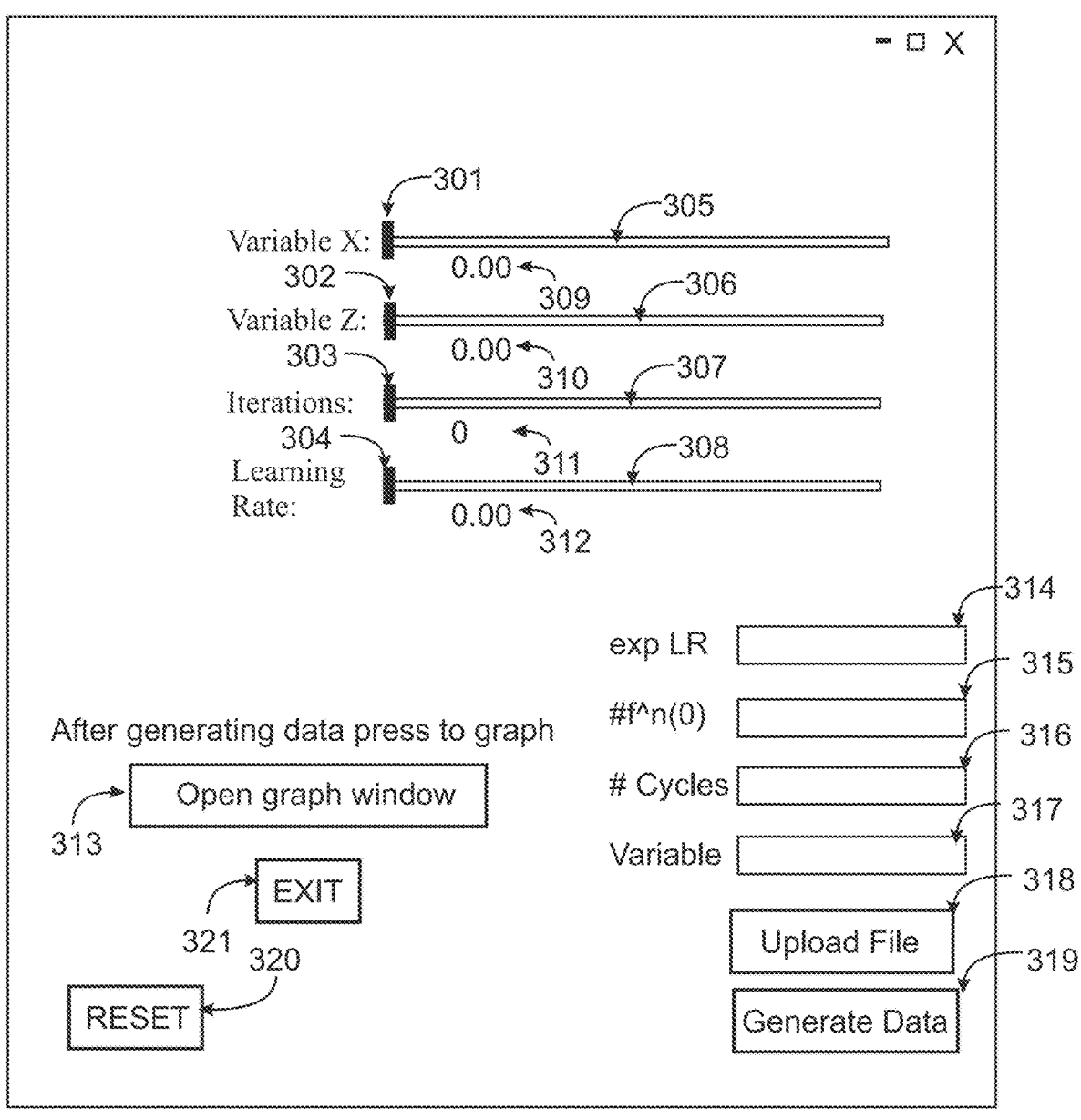
FIG. 3A illustrates a graphic user interface (GUI) in an embodiment of the invention.

FIG. 3A illustrates an interactive graphical user interface (GUI) presented either by a web site as mentioned above, or by a mobile application on a user's platform. An initial step is to upload a file containing the data for which a synthetic data distribution will be generated. This is done by clicking on an "Upload File" button 318 in the lower right corner of the GUI. Clicking on this button will enable the user to use file-explorer to select a comma-separated file (CSV) file containing the data for uploading. The values in the CSV file are x and y values for datapoints in an original data file which will be used to generate the synthetic data set.

After selecting a file, parameters in the process described above need to be set. There are a total of 7 parameters which can be adjusted which affect the distribution of the data: Variable X is a distance along the x axis for which the Maclaurin series will be evaluated, as described above. Variable X is designated as either a positive integer or a positive decimal. In the GUI of FIG. 3A, Variable X is represented by a slider 301 which the user may move along a track 305, and as slider 301 is moved a value between 0 and 100 is posed in window 309, which will read 100 if slider 301 is placed at the far right end of track 305. It is to be noted that in this prototype GUI, the range of 0 to 100 was selected, however, values higher than 100 can be used on the slider as well in future versions.

Variable Z_is a multiplier the system uses to multiply terms of the original Maclaurin series to create a new Maclaurin series. In the GUI of FIG. 3A, Variable Z is represented by a slider 302 which the user may move along a track 306, and as slider 302 is moved, a value between 0 and 100 is posed in window 310, which will read 100 if slider 302 is placed at the far right end of track 306. It is to be noted that in this prototype GUI, the range of 0 to 100 was selected, however, values higher than 100 can be used on the slider as well in future versions.

Slider 303 is for "iterations" and may be moved along track 307. The iterations slider pertains to gradient descent. Specifically, the number of iterations selected by the slider refers to the number of iterations to be used in the gradient descent process. The value of the iterations is shown in window 311.

Slider 304 is for "learning rate" and may be moved along track 308 with value posted in window 312. This pertains to gradient descent as well.

The text box called "exp. LR" 314 can be used to lower the learning rate (which is already selected on the slider), exponentially if needed. A number must be typed into this box. The higher the number typed in this box, the lower the learning rate will become at an exponential rate.

The text box "#f^n(0)" 315 refers to the number of nth derivative terms which will be calculated per data point.

The text box "#Cycles" 316 refers to the number of times the overall process will be run, with an input of 1 referring to the initial data distribution. With each cycle, an additional synthetic data distribution is created.

The text box "Variable" 317 refers to the variable in the dataset that will be selected for graphing after the data has been generated. This box can be filled before or after generating the data.

Once all parameters are adjusted, a user may click on the "Generate Data" button 319 in the lower right corner to generate the various data distributions. Once the data is generated, the new dataset consisting of both the original and the new data distributions will be exported to an excel file and downloaded to the computer for further use.

For a visualization of the data created, a user can click on the button 313 "Open Graph Window" in the lower left corner of the GUI. This opens a separate window with different graphical illustrations.

In a circumstance that the data needs to be reset at any time, a "reset" button 320 on the lower left corner of the GUI clears all parameters and removes all graphs. Once finished, the user may exit the GUI with the "Exit" button 321 near the lower left corner of the GUI.

Figure 3B:
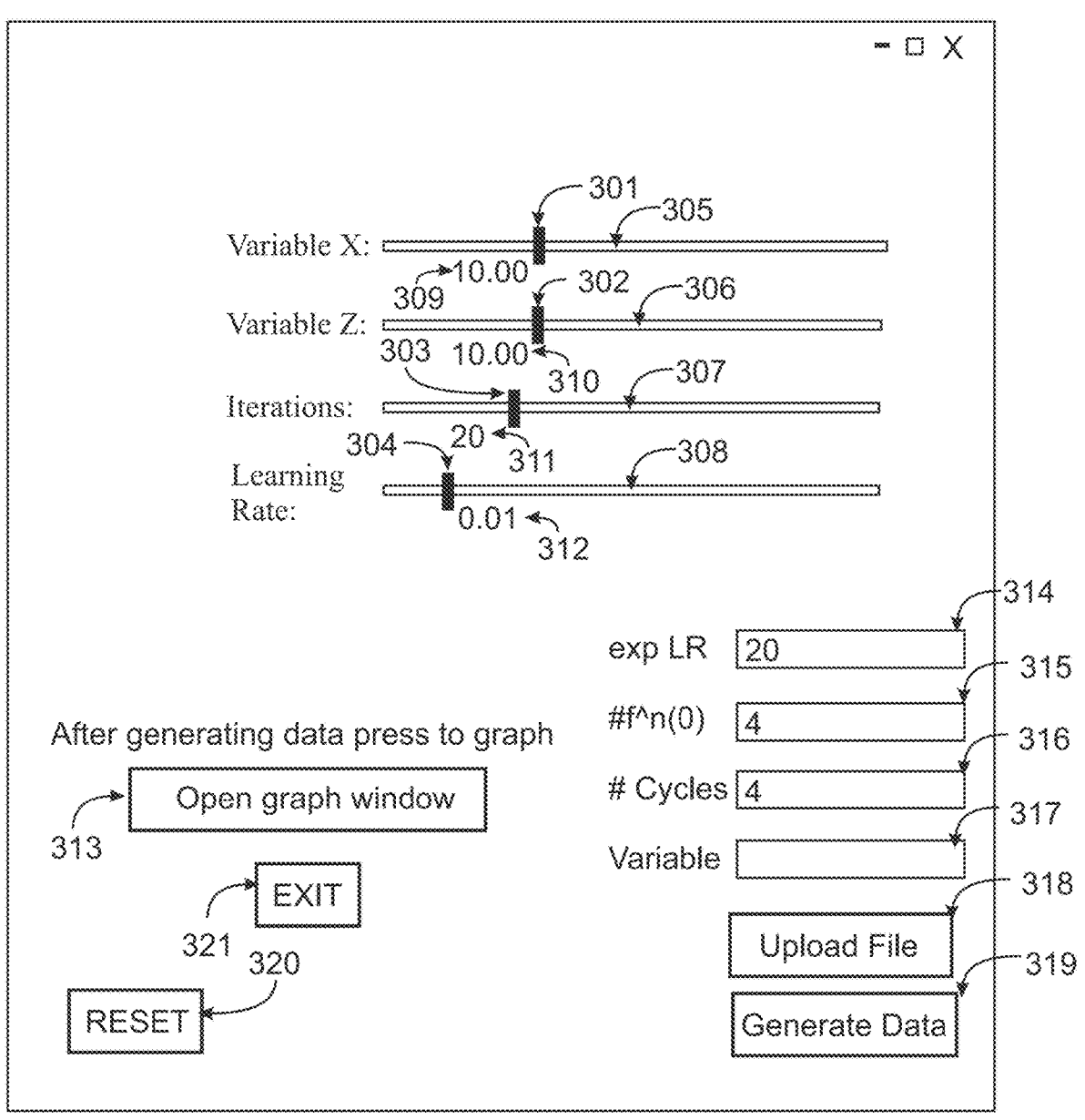
FIG. 3B illustrates the GUI of FIG. 3A with some inputs.

FIG. 3B is a rendition of the GUI of FIG. 3A with the sliders set to input specific values. In the GUI of FIG. 3B variable X slider 301 has a range of zero to one-hundred, and the slider is set to a value of ten, which is reported in window 309. Variable Z has a range in this example of zero to one hundred although this may be different in other embodiments, and the slider is set to make variable Z a value of ten, as is shown in window 310. Iterations has a range in this example of 0 to 500 and slider 303 is set for a value of twenty, as is shown in window 311. Learning rate has in this example a range of one hundred, although this may be different in other embodiments. Slider 304 is set for a value of 0.01.

In FIG. 3B 20 is entered in input window 314 and this will lower the learning rate exponentially. Box 315 has a number 4 entered, and this is the number of nth derivative terms which will be calculated per data point. Box 316 also has a 4, and this represents the total number of distributions which will be generated, including the original.

Despite the number of different parameters, the GUI is very user-friendly. In summary, all one needs to do is: 1. Upload Data. 2. Use only four sliders and four text boxes which are all easily adjustable. 3. Put numbers in three text boxes. 4. Generate synthetic data. 5. Graph if desired using fourth textbox to select variable.

A randomization process within certain ranges for each variable may be added in a future version to generate incredibly many different combinations of synthetic data.

Figure 4:
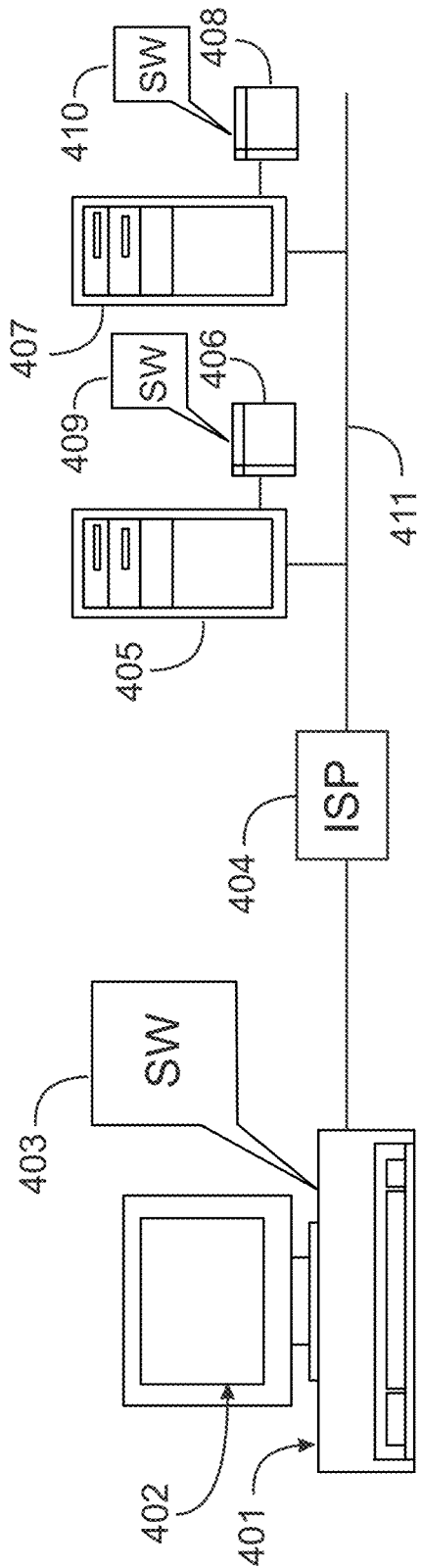
FIG. 4 is a representation of a computing appliance coupled to an Internet network.

A skilled person will understand that constructing Maclaurin series and performing the steps described above in generating synthetic datasets will in many circumstances require a computing appliance and in some cases communication with an Internet connected domain. FIG. 4 is a representation of a computing appliance 401 having a display screen 402 executing software on a processor not shown, Computing appliance 401 is coupled through an Internet Service Provider (ISP) 404 to the well-known Internet network represented by a line 409, which is meant to represent all of the networks and subnetworks in the Internet. A first Internet-connected server 405 is illustrated coupled to a data repository 406 storing software 409 executed by a processor of the server. A second Internet-connected server 407 is illustrated coupled to a data repository 408 storing software 410.

In an embodiment of the invention synthetic data may be generated by executing SW 403 on computing appliance 401, displaying the GUI described above on display screen 402 enabling a user to enter variables and parameters and to perform the steps to generate the synthetic datasets. In one circumstance a mobile application may be downloaded from one of the Internet-connected servers. In another circumstance a user may connect appliance 401 to one of the Internet-connected servers, which may provide the GUI and perform the calculations necessary to generate the synthetic datasets.

Figures 5A, 5B:
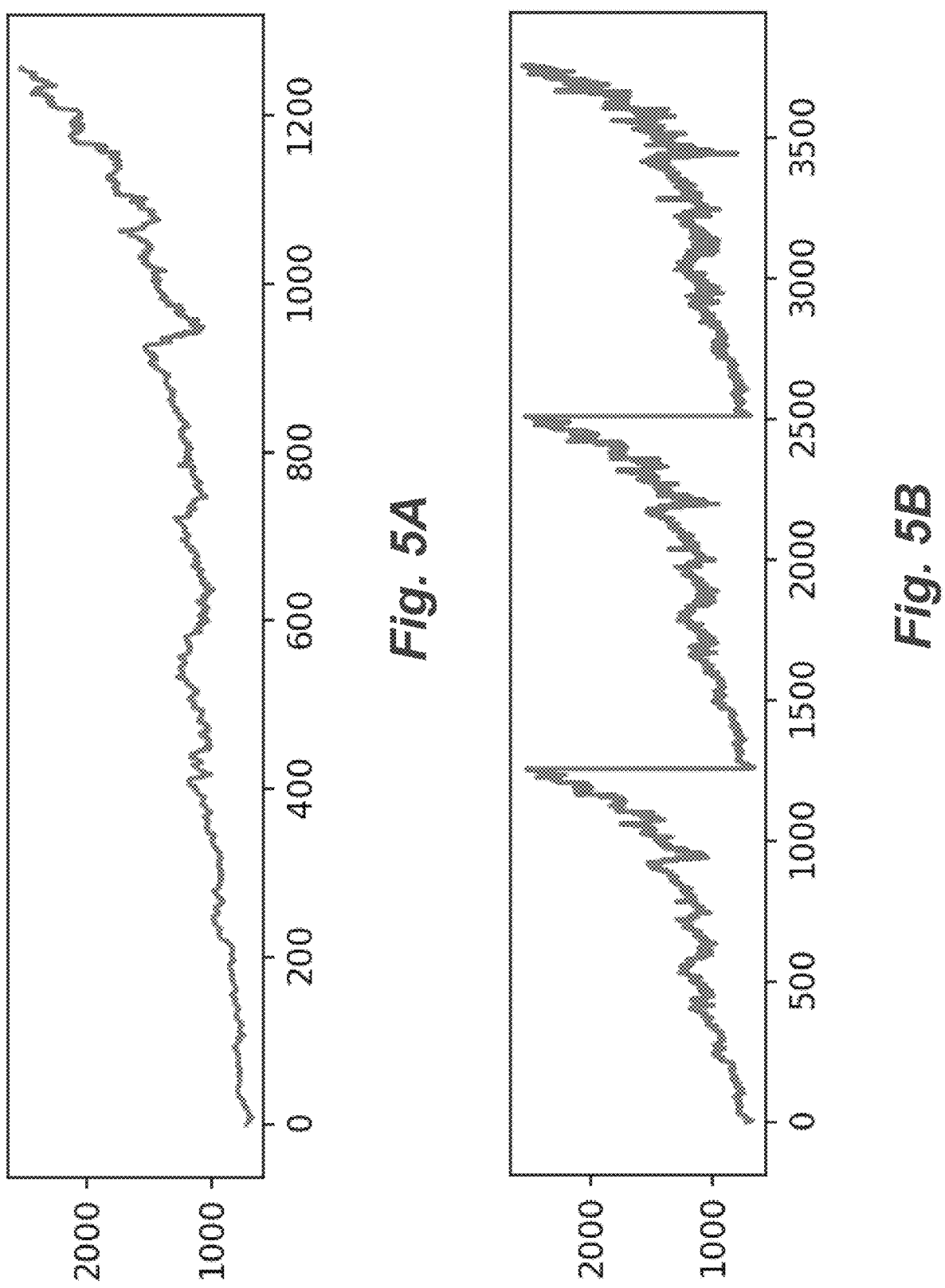
FIG. 5A illustrates a graph of synthetic data and original data overlaid.
FIG. 5B illustrates data in successive iterations.
Figure 5C:
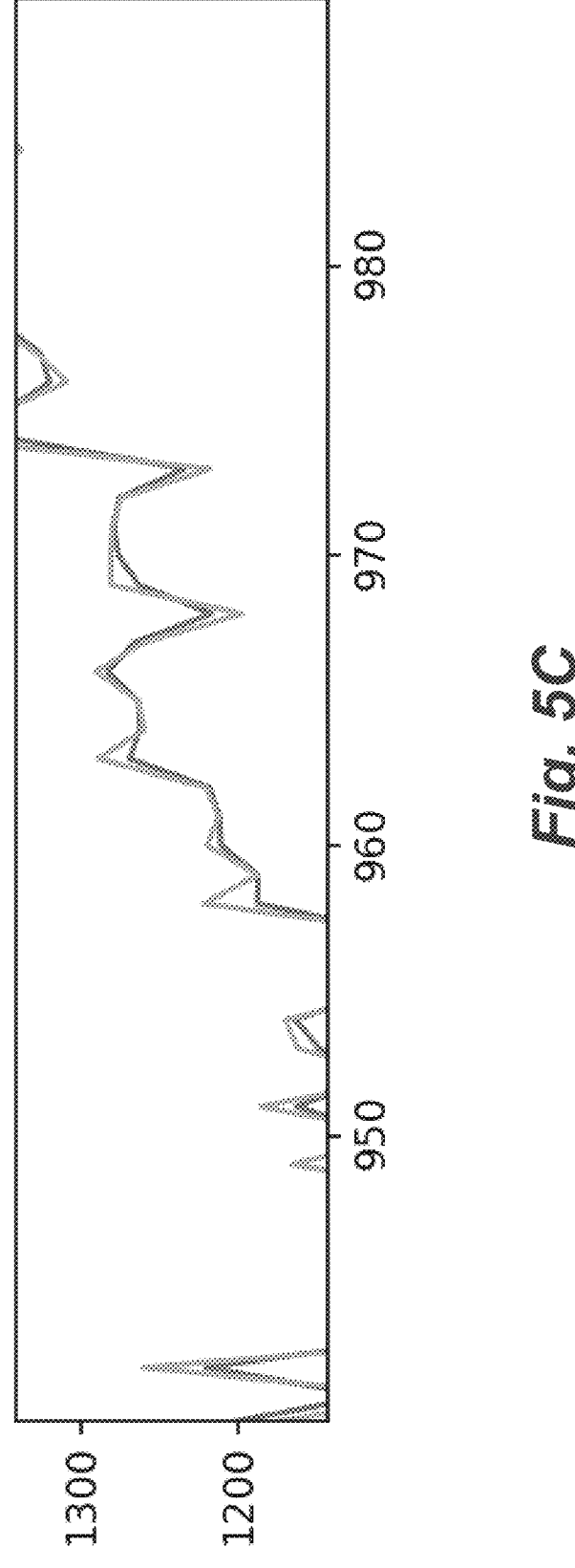
FIG. 5C is an enlarged portion of the graph of FIG. 5A to show original data and synthetic data overlaid.

FIG. 5A is a graph of synthetic data generated with the GUI settings as shown in FIG. 3B. The original data is overlaid with the synthetic data generated, but the scale is such that the two may not be seen as separate in FIG. 5A. FIG. 5B is a graph of the data of FIG. 5A in a first portion from x=0 to x=1250, and new synthetic data produced in a second iteration from x=1250 to x=2500, and a third iteration from x=2500 to x=3750. Again, the scale is such that the original data may not be seen as separate from the synthetic data. FIG. 5C is a graph of a portion of the graph of FIG. 5A in shows the synthetic data and the original data superimposed between x=940 and x=990. The act of zooming in causes data to be cut off above as shown. The original data is shown as a graph line with a darker shade, and the synthetic data generated in a lighter shade.

A person with skill in the art will understand that the embodiments described are entirely exemplary and not limiting to the scope of the invention. There are many variations to the embodiments described that might be made without limiting the scope. The GUI, for example, may have more or fewer functions, and the inputs in the GUI may be of different sorts than shown in the figures. The order of operations in some instances may be somewhat different. The scope of the invention is only limited by the claims that follow.

The invention claimed is:

1. A computer-implemented method executed by software on a processor of a computerized device for increasing output efficiency of machine learning models by generating specific synthetic datasets enabled to at least train a machine learning model, comprising steps of:

selecting an original graph of data points as an original dataset;

constructing a first Maclaurin series at a first data point in the original dataset;

multiplying an input, X, of the first Maclaurin series by a constant, thereby modifying the first Maclaurin series;

applying a recursive derivative process, deriving general expressions for an nth derivative of the original graph dataset at X=0, that is f″ (0) thereby obtaining derivative-based coefficient values corresponding to the original dataset at the first data point;

incorporating the obtained coefficient values into the first modified Maclaurin series, generating a second Maclaurin series;

evaluating the second Maclaurin series at a second datapoint in the original dataset thereby generating a first datapoint in the synthetic dataset;

shifting to each successive data point in the original dataset and repeating the constructing, modifying, incorporating, and evaluating steps to generate additional synthetic data points;

repeating the steps in order until each datapoint in the original dataset has been used to generate a datapoint in the synthetic dataset thereby increasing an amount of synthetic data and increasing a variation level of the synthetic data; and implementing the synthetic dataset to train the machine learning model thus improving efficiency and accuracy of outputs of the machine learning model while requiring less computational bandwidth commonly used in generative neural network techniques for synthetic data generation and use.

2. The method of claim 1 wherein the constant used for multiplying is selected as either a positive decimal or a positive integer value.

3. The method of claim 1 wherein an interactive graphic user interface (GUI) is provided on a display screen of a computerized appliance, the GUI having input mechanisms enabling a user to upload the original dataset, to enter values for variables in the first Maclaurin series and parameters required to implement the steps to generate the synthetic data sets from the original dataset, comprising;

(a) uploading the original dataset, (b) entering the variable values and parameters, and (c) selecting a data input, upon which the computerized appliance performs the steps of the method and generates a number of synthetic datasets according to a number of cycles input, and a new dataset consisting of both the original dataset and the synthetic datasets are exported to a spreadsheet file and saved prior to implementation.

4. The method of claim 3 wherein the GUI further comprises an input to open a graph window on the display screen of the computerized appliance and to display the original and generated synthetic datasets demonstrating a diversity level between the synthetic datasets and the original dataset.

5. The method of claim 3 wherein the GUI has a "reset" input, that, when selected, clears all parameters.

6. A system for generating controlled synthetic datasets enabling at least creating and training of machine learning models, comprising:

a computerized appliance having a processor and a display screen;

software executing on a processor of the computerized appliance; and a graphical user interface (GUI) displayed on the display screen of the computerized appliance by the software executing on the computerized appliance, the GUI having input mechanisms enabling a user to upload an original dataset, to enter values for variables in a Maclaurin series and parameters required to implement steps to generate synthetic data sets from the original dataset, the steps comprising (a) uploading the original dataset, (b) entering the variable values and parameters, and (c) selecting a generate data input, upon which the computerized appliance performs the steps of the method and generates a number of synthetic datasets according to a number of cycles input, and a new dataset consisting of both the original dataset and the new dataset is displayed in a display of the GUI and is exported to spreadsheet file and saved.

7. The system of claim 6 wherein, upon a user selecting the generate data input the system constructs a first Maclaurin series at a first data point in the original dataset of data points, multiplies the first Maclaurin series by a constant, applies a recursive derivative process deriving general expressions for an nth derivative of the original dataset at X=0, incorporates derived values of the nth derivative f″ (0) into the first Maclaurin series, generating a new Maclaurin series, evaluates the new Maclaurin series at a second datapoint in the original graph as a first datapoint in a synthetic dataset, shifts to a second data point in the first Macaurin series, repeats the previous steps to generate a second datapoint in the synthetic dataset; and repeats the process until a last datapoint in the original dataset has been used to generate a final datapoint in the synthetic dataset.

8. The system of claim 7 wherein the GUI has an input for setting a value for the constant used for multiplying, an input for setting a value for a distance along an x axis of the original graph for which the Maclaurin series will be evaluated, an input for setting a value for a number of iterations for the recursive derivative process, and an input for setting a value for a learning rate as a change in each iteration.

9. The system of claim 8 wherein the GUI further has an input for creating synthetic data that is diverse a value that may be used to lower the learning rate exponentially, an input for a value that will be a number of nth derivative terms which will be calculated per data point, an input for a value that will be a number of times the overall process will be run, and an input for a value to for a variable in the dataset that will be selected for graphing after the synthetic dataset has been generated.

10. The system of claim 8 wherein the input for the distance along the x axis for which the first Maclaurin series will be evaluated, and the input for the constant used for multiplying are each a slider on a track that a user may move to increase and decrease values including at least the constant used for multiplying.

11. The system of claim 10 wherein a value is displayed in the GUI for the distance along the x axis and for the constant used for multiplying proximate the sliders.

12. The system of claim 9 wherein the input for the value used to lower the learning rate exponentially and the input for the value that will be the number of nth derivative terms which will be calculated per data point are each a slider on a track that a user may move to increase and decrease the values for variables, and a value selected by the slider is displayed proximate the slider.

* * * * *